INVENTOR
GERALD E. GRANT

INVENTOR
GERALD E. GRANT

3,453,025
OPERATOR'S SEAT ASSEMBLY
Gerald E. Grant, East Peoria, Ill., assignor to Caterpillar Tractor Co., Peoria, Ill., a corporation of California
Filed Feb. 8, 1968, Ser. No. 704,177
Int. Cl. B60n 1/02
U.S. Cl. 297—313                                  3 Claims

ABSTRACT OF THE DISCLOSURE

A vehicle operator's seat having a seat frame pivoted upon a platform with the platform supported by rubber mountings upon a vehicle frame member. A pair of primary latches normally secures the pivotal seat frame in an upright position while a safety latch prevents accidental overturning of the seat in the event of the first pair of latches failing.

---

In the design of heavy machinery or vehicles such as earth moving equipment, increasing attention is being given to providing for the safety and comfort of the operator. These goals are desirable in themselves and additionally tend to increase operating efficiency. For example, it is desirable to isolate the operator as much as possible from noise and vibration common in such machinery. Further, it is common practice to pivot the operator's seat, for example, to permit ready access to components such as batteries situated beneath the seat. Seat belts, which are becoming common on this type of equipment, are most conveniently anchored to the pivoted seat portion so that they stay with the seat as it is titled. Therefore, it is additionally desirable to provide means for positively insuring that the seat will not tilt or overturn during operation of the machinery.

The present invention provides a seat assembly having these desirable characteristics. A seat frame is pivoted to a platform mounted upon a suitable member of the machine. Primary latch means normally retain the seat frame in an upright position and are releasably operable to permit tilting of the seat. Safety latch means are also associated with the seat frame to positively limit tilting of the seat in the event of failure of the primary latch means.

The seat assembly of the present invention is particularly contemplated for use with earth moving equipment such as tractors and loaders. However, the invention may be employed to equal advantage with other machinery or vehicles where these same characteristics are desirable.

The features of the present invention providing these advantages as well as other features and advantages of the invention are made apparent in the following description having reference to the accompanying drawings wherein.

Figure 1:
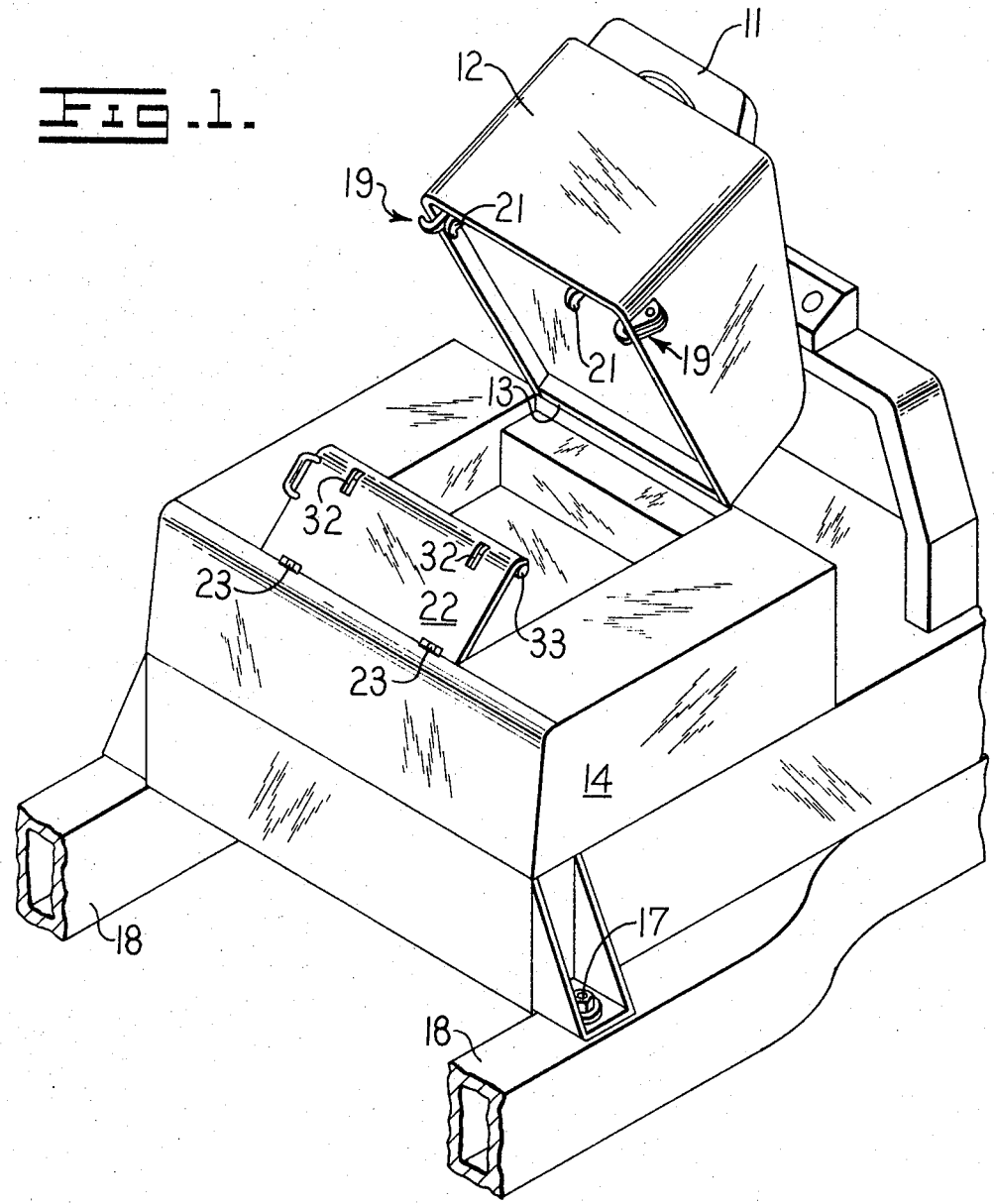
FIG. 1 is a perspective view of the present seat assembly with the seat frame pivoted forwardly upon its platform.
Figure 2:
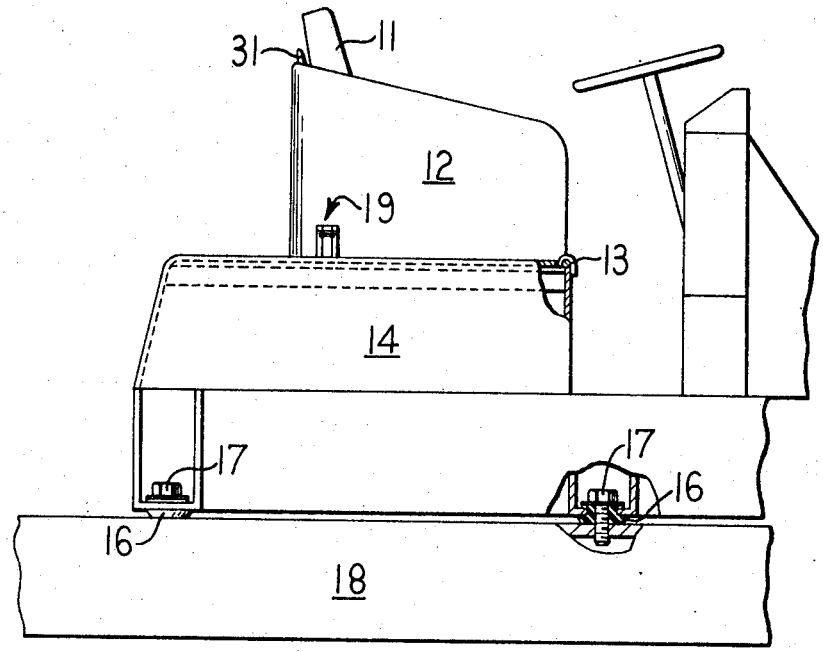
FIG. 2 is a side view in elevation, with parts in section, of the seat assembly of FIG. 1.

Referring now to FIGS. 1 and 2, the present seat assembly comprises a seat 11 and a seat frame 12 which is pivoted along its forward edge 13 to a platform 14. The platform is mounted upon cushion means 16, of a material such as rubber, and is secured by bolts 17 to a suitable member of the machine or vehicle (not shown) such as its main frame members 18. A pair of primary latches 19 normally secures the seat frame to the platform with the seat in an upright position. The primary latches are releasably operable to permit forward tilting of the seat and seat frame. To positively limit forward tilting or overturning of the seat in case of failure or disengagement of the primary latches 19, a safety latch assembly comprises a pair of lugs 21 secured to the bottom of the seat frame. A plate 22 is pivoted to the platform at 23 so that the plate is free to pivot against the seat frame.

Figure 4:
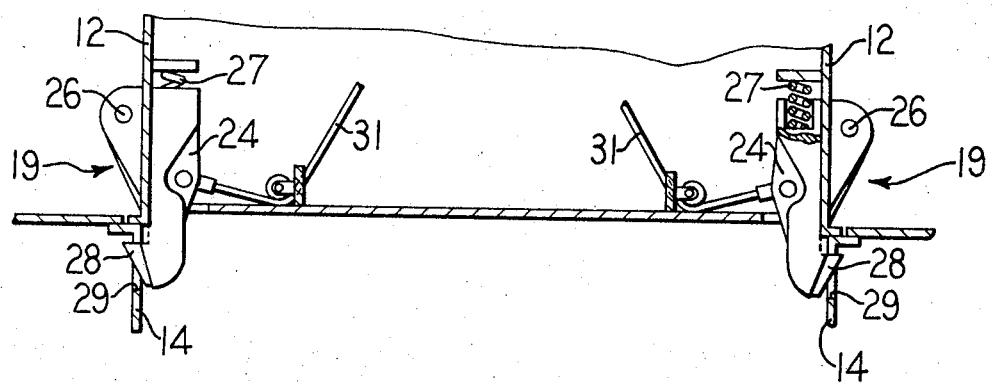
FIG. 4 is a fragmentary view taken from the left side of FIG. 2 and illustrating primary latching means for the seat frame.

Having particular reference to FIG. 4, one of the primary latches 19 is disposed upon each side of the pivotal seat frame 12. Each primary latch assembly comprises a latch lever 24 pivoted to the seat frame at 26. Springs 27 interact between the seat frame and the latch levers 24 tending to pivot the latch levers and urge their projecting portions 28 into engagement with the platform 14. When the seat frame is pivoted against the platform with the seat in an upright position, the lever projections 28 engage holes 29 in the platform and normally prevent forward tilting or overturning of the seat. To release the primary latches and tilt the seat frame forwardly when desired, a cable 31 is connected to each latch lever. Retraction of the cable urges the levers against their springs 27 and releases the seat frame from the platform.

Figure 3:
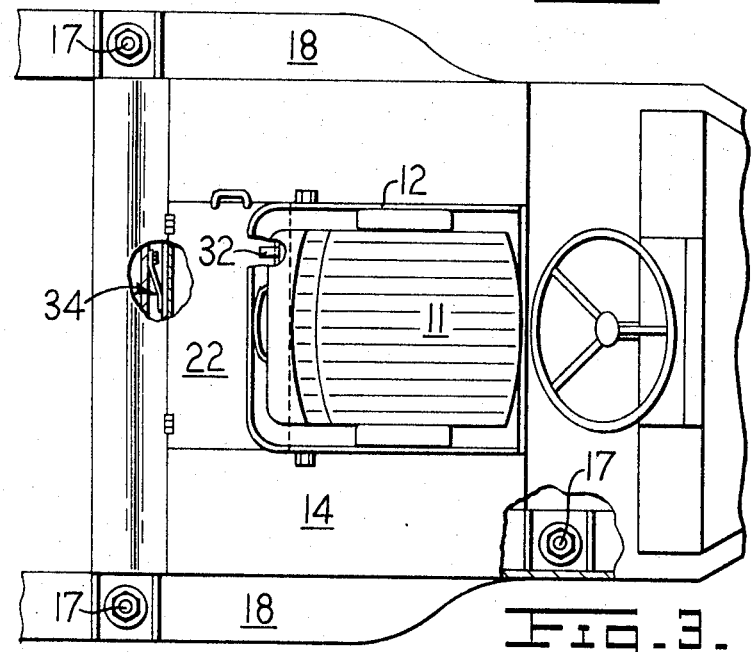
FIG. 3 is a plan view, with parts in section, of the seat assembly of FIG. 1.
Figure 5:
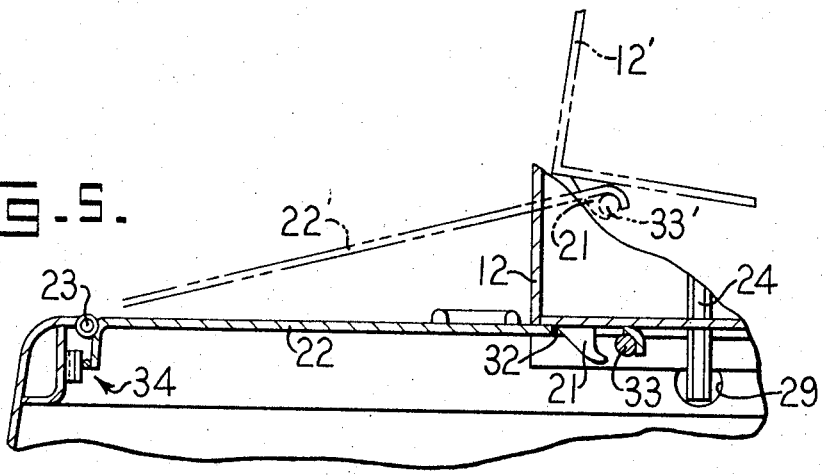
FIG. 5 is a side view in elevation, with parts in section, of a safety latch for the seat assembly together with fragmentary portions of the seat frame and platform.

Since the primary latches may fail or be improperly engaged with the platform when the seat is in a generally upright position, the safety latch referred to above provides a means of positively limiting forward tilting of the seat to protect the operator from possible injury. With the seat frame pivoted against the platform in an upright position, as shown by solid lines in FIG. 5, the safety latch lugs 21 penetrate slots 32 (see FIG. 1 also) in the pivotal plate 22. A bar 33 is secured to the forward edge of the pivotal plate 22 as by welding. When the seat frame is in its upright position against the platform, the bar is spaced slightly forward of the safety latch lugs. Spring means 34 (FIGS. 3 and 5) interacts between the platform 14 and the safety latch plate 22 tending to pivot the plate upwardly against the seat frame. As the seat frame commences to tilt forwardly upon failure or accidental disengagement of the primary latches, the spring 34 pivots the safety latch plate upwardly along with the seat frame. Forward tilting of the seat frame is positively limited when the safety latch lugs 21 engage the bar 33 upon the pivotal plate 22. The engaged positions of the seat frame and the safety latch components are shown with broken lines and indicated by primed numerals. Thus, the safety latch mechanism provides a positive means for limiting accidental forward tilting or overturning of the seat. Easy access to the region beneath the seat frame is maintained since the seat frame may be readily tilted forwardly by pressing downwardly upon the safety latch plate 22 while disengaging the primary latches 19. Pressing the safety latch plate downwardly, as by stepping on it, permits the safety latch lugs to exit the slots 32 without coming into engagement with the bar 33. Thus, the present invention provides an improved seat assembly wherein the seat and seat frame may be tilted forwardly for access to components therebeneath. The operator is substantially isolated from noise and vibration passing from the machine or vehicle through the seat platform. The safety latch positively limits forward tilting of the seat to protect the operator from injury.

What is claimed is:

1. A seat assembly for a machine operator comprising a seat frame pivotally secured to a platform, primary latch means for securing the pivotal seat frame to the platform, said primary latch means being releasable operable to permit tilting of the seat frame, and safety latch means associated with the seat frame and platform to positively limit tilting of the seat frame away from the platform wherein said safety latch means comprises a plate oppositely pivoted to the platform from the seat frame for engagement with the seat frame when the seat frame is pivoted against the platform, spring means for urging the pivotal plate upwardly against the seat frame and at least one lug for providing positive engagement between the seat frame and plate as both are pivoted upwardly.

2. The invention of claim 1 wherein said lug projects downwardly from the seat frame and the pivotal plate is notched to receive the lug, means disposed on the plate forwardly of the notch to enter into engagement with the lug as the plate and seat frame pivot upwardly together.

3. The invention of claim 1 wherein the primary latch means comprises a spring-loaded latch lever on each side of the seat frame for normal engagement with the platform and means for releasably urging the latch levers against their springs.

References Cited
UNITED STATES PATENTS

| | | | |
|---|---|---|---|
| 2,253,660 | 8/1941 | Tell | 292—128 |
| 2,605,813 | 8/1952 | Seitz | 297—307 XR |
| 2,840,140 | 6/1958 | Harrington | 297—303 XR |
| 2,932,341 | 4/1960 | Morrison et al. | 297—314 XR |
| 3,369,629 | 2/1968 | Weiss | 180—27 |

BOBBY R. GAY, *Primary Examiner.*

GLENN O. FINCH, *Assistant Examiner.*

U.S. Cl. X.R.

297—344, 379